(12) United States Patent
Goto et al.

(10) Patent No.: US 6,219,213 B1
(45) Date of Patent: *Apr. 17, 2001

(54) MAGNETIC HEAD WITH MAGNETIC TUNNEL ELEMENT IN WHICH INDUCED MAGNETIC FIELD CHANGES RELATIVE ANGLE OF MAGNETIZATION WHICH AFFECTS TUNNEL CURRENT

(75) Inventors: Kazuo Goto; Seiji Kumagai, both of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,015

(22) Filed: Jun. 26, 1998

(30) Foreign Application Priority Data

Jun. 27, 1997 (JP) .................................................. 9-172635

(51) Int. Cl.[7] ........................................................ G11B 5/39
(52) U.S. Cl. ............................................................ 360/329.2
(58) Field of Search ...................................... 360/113, 321, 360/324.2, 125, 126

(56) References Cited

U.S. PATENT DOCUMENTS

| | | | |
|---|---|---|---|
| 5,463,516 | * 10/1995 | Valet | 360/113 |
| 5,729,410 | * 3/1998 | Fontana | 360/113 |
| 6,137,652 | * 10/2000 | Ezaki | 360/126 |

* cited by examiner

*Primary Examiner*—A. J. Heinz
(74) *Attorney, Agent, or Firm*—Sonnenschein, Nath & Rosenthal (57) ABSTRACT

The present invention provides a magnetic head which has a magnetic circuit of a reduced size to cope with a high density recording and a preferable recording/reproduction characteristic. The magnetic head according to the present invention has at least partially a non-magnetic body 7 and includes: a magnetic circuit block 6 constituted by magnetic bodies arranged to oppose each other via the non-magnetic body 7; and a magnetic tunnel element 1 attached to this magnetic circuit block 6 and having a first magnetic layer 2 and a second magnetic layer 4 which are layered via an insulation layer 3. In this magnetic head, a magnetic field from a magnetic recording medium is induced to the magnetic circuit block and the induced magnetic field changes a relative angle of magnetization of the first magnetic layer 2 and/or the second magnetic layer 4 with the other magnetic layer of the magnetic tunnel element 1.

6 Claims, 7 Drawing Sheets

FIG.1

(PRIOR ART)

MAGNETIC HEAD WITH MAGNETIC TUNNEL ELEMENT IN WHICH INDUCED MAGNETIC FIELD CHANGES RELATIVE ANGLE OF MAGNETIZATION WHICH AFFECTS TUNNEL CURRENT

BACKGROUND OF THE INVENTION

1. Field of the Invention

The present invention relates to a magnetic head for recording and/or reproducing a magnetic signal onto/from a magnetic recording medium and in particular to a magnetic head of yoke type having a magnetic circuit block.

2. Description of the Prior Art

Recently, in the magnetic recording medium such as a hard disc tends to increase its capacity, while increasing its recording density per unit surface. In such a situation, development of a magnetic head for recording and reproducing onto/from the recording medium having a large capacity.

Figure 1:
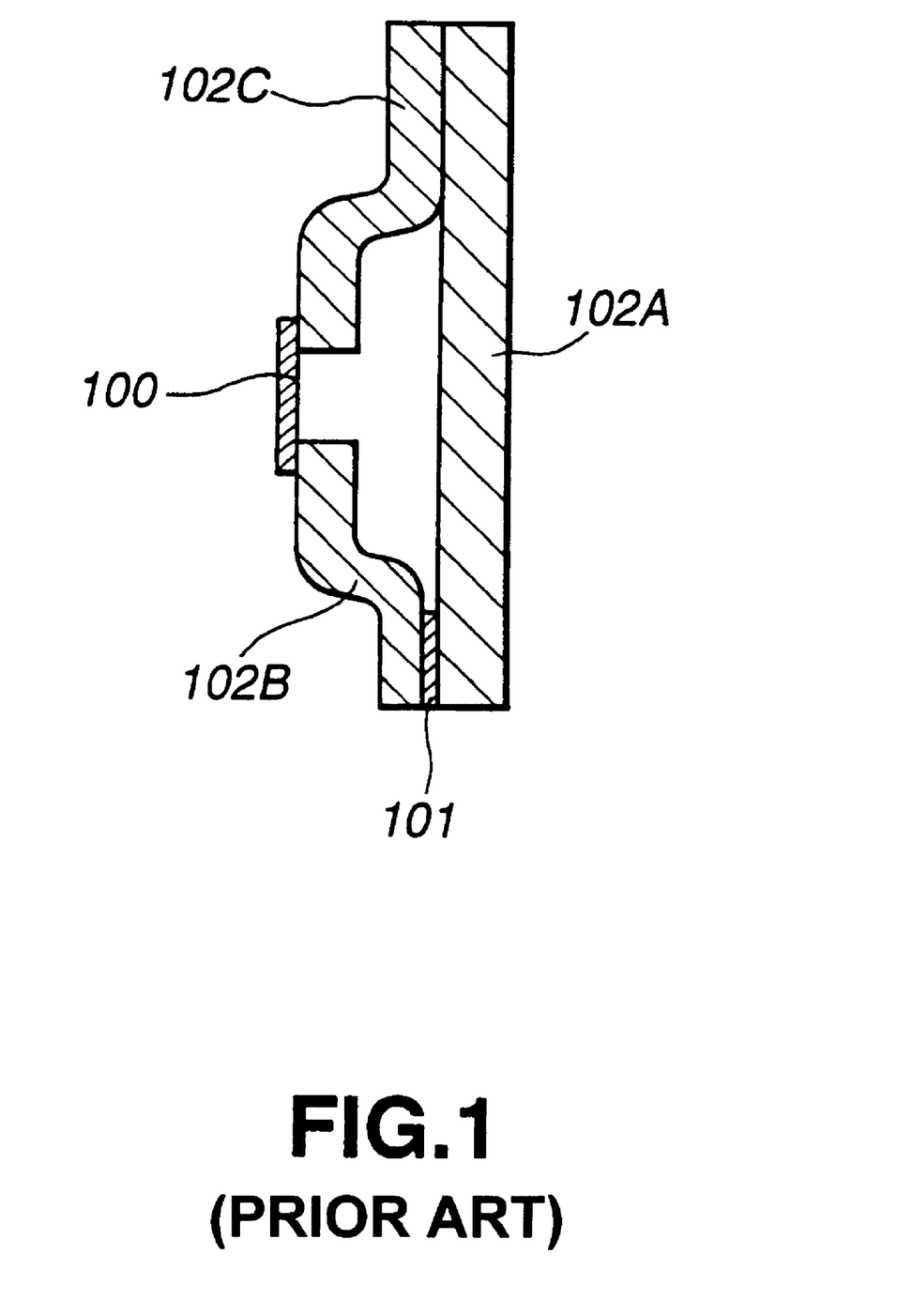
FIG. 1 is a cross sectional view showing a conventional magnetic head using a magnetoresistance effect element.

Recently, as a magnetic head for such a magnetic recording medium having a large capacity, there has been used a magnetic head using a magnetoresistance effect element as a magneto-sensitive block (hereinafter, referred to as an MR head). As an MR head, there is a yoke type MR head as schematically shown in FIG. 1 including yokes 102A, 102B, and 102C and having a magnetoresistance effect element 100 and a non-magnetic body 101. This yoke type MR head is constructed in such a manner that the magnetoresistance effect element 100 serving as a magneto-sensitive block will not slide along a magnetic recording medium, which enables to obtain an excellent durability. That is, in this yoke type MR head, the magnetoresistance effect element 100 serving as the magneto-sensitive block will not be brought into contact with the magnetic recording medium which may wear the magnetoresistance effect element 100.

In this yoke type MR head, the yoke 102A is arranged so as to oppose to the yoke 102B through the non-magnetic body 102, forming a magnetic gap. Through this magnetic gap, signal magnetic field from the magnetic recording medium is taken in. Moreover, in this yoke type MR head, the magnetic field take in causes a flow of magnetic flux through the magnetoresistance effect element 100 and yokes 102A, 102B, and 102C, so as to constitute a magnetic circuit.

At this moment, in the magnetoresistance effect element 100, its magnetization direction is changed by the magnetic flux flowing through the magnetic circuit, which in turn brings about a change of resistance value. In this yoke type head, a signal magnetic field is sensed by detecting the resistance change of the magnetoresistance effect element 100. That is, this magnetoresistance effect element 100 does not detect a signal magnetic field directly but detects a magnetic field take in by the yokes 102A, 102B, and 102C.

In the aforementioned yoke type MR head, the magnetoresistance effect element 100 is arranged between the yoke 102B and the yoke 102C. That is, in this yoke type MR head, a magnetic gap is formed between the yoke 102B and the yoke 102C which form the magnetic circuit, and the magnetoresistance effect element 100 is arranged in this magnetic gap.

When the magnetoresistance effect element 100 is formed in the magnetic gap between the yoke 102B and the yoke 102C, there will arise a large magnetic resistance at the bonding portion between the magnetoresistance effect element 100 and the yoke 102B and the at the bonding portion between the magnetoresistance effect element 100 and the yoke 102C. Accordingly, in the aforementioned yoke type MR head, the magnetic flux flowing through the magnetic circuit is reduced, which lowers the detection sensitivity of the magnetoresistance effect element 100.

That is, in a conventional magnetic head, even if the magnetoresistance effect element 100 is used to cope with a high density recording, it is impossible to obtain a sufficient recording/reproduction characteristic. Thus, conventionally there has been no magnetic head which has a reduced size of magnetic circuit for a high density recording and has a sufficient recording/reproduction characteristic.

SUMMARY OF THE INVENTION

It is therefore an object of the present invention to provide a magnetic head having a magnetic circuit of a reduced size to cope with a high density recording and having a sufficiently preferable recording/reproduction characteristic.

In order to achieve the aforementioned object, the magnetic head according to the present invention includes: a magnetic circuit block having at least partially a non-magnetic body through which magnetic bodies are opposed to each other, so as to constitute a magnetic path; and a magnetic tunnel element attached on the magnetic circuit block and including a first magnetic layer and a second magnetic layer which are layered via an insulation layer. This magnetic head is characterized in that a magnetic field from a magnetic recording medium is induced in the magnetic circuit block and the induced magnetic field changes a relative angle of magnetization of the first magnetic layer and/or the second magnetic layer with respect to the other magnetic layer.

In the magnetic head according to the aforementioned configuration having the aforementioned configuration, a magnetic field generated from a magnetic recording medium is induced to the magnetic circuit block. The magnetic circuit block is magnetized in a predetermined direction, applying a magnetic field to the magnetic tunnel element. Thus, in the magnetic tunnel element, the first magnetic layer and/or the second magnetic layer is magnetized in a predetermined direction, so as to have a predetermined relative angle between the magnetization of the first magnetic layer and that of the second magnetic layer. In this magnetic tunnel element, according to the relative angle of magnetization of the first magnetic layer with respect to the second magnetic layer, a tunnel current flowing between the first magnetic layer and the second magnetic layer changes its resistance value. Consequently, the magnetic head can detect the magnetic field from the magnetic recording medium by detecting the resistance value change of the tunnel current flowing between the first magnetic layer and the second magnetic layer.

BRIEF DESCRIPTION OF THE DRAWINGS

FIGS. 4A–4H are a series of views in cross section useful for illustrating that portion of a magnetic head where a magnetic tunnel element is provided.

DETAILED DESCRIPTION OF PREFERRED EMBODIMENTS

Hereinafter, description will be directed to a magnetic head according to a preferred embodiment of the present invention with reference to the attached drawings.

Figure 2:
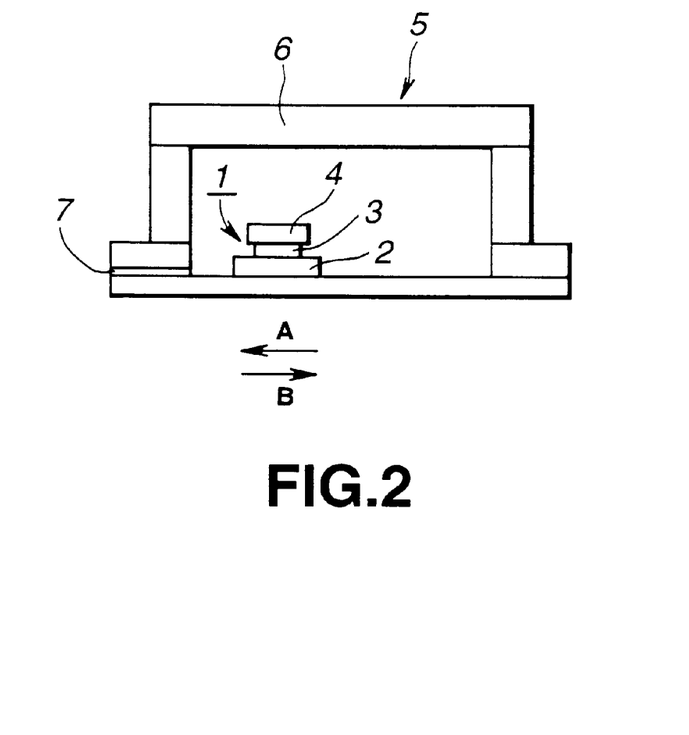
FIG. 2 is a side view showing a magnetic head according to the present invention.

As shown in FIG. 2, this magnetic head has a magnetic tunnel element 1 as magnetic field detecting means. This magnetic tunnel element 1 includes: a first magnetic layer 2; an insulation layer 3 formed on this first magnetic layer 2; and a second magnetic layer 4 formed via the insulation layer 3 over the first magnetic layer 2. In this magnetic tunnel element, there is provided an insulation state between the first magnetic layer 2 and the second magnetic layer 4. That is, no current other than a tunnel current flows between the first magnetic layer 2 and the second magnetic layer 4.

Moreover, this magnetic tunnel element 1 is connected to a constant current source (not depicted) for supplying a predetermined tunnel current in the direction of the layer formation. In this magnetic tunnel element 1, the constant current source is electrically connected to the first magnetic layer 2 and to the second magnetic layer 4, so that a tunnel current flows between the first magnetic layer 2 and the second magnetic layer 4 via the insulation layer 3.

In this magnetic tunnel element 1, the first magnetic layer 2 and the second magnetic layer 4 are made from a magnetic material such as Fe, FeNi, FeMn, and the like. Moreover, the insulation layer 3 is made from an insulation material such as $Al_2O_3$. In this magnetic tunnel element 1, the insulation 3 has a film thickness not limited to a particular value but it should be a value which enables a tunnel current to flow between the first magnetic layer 2 and the second magnetic layer 4, for example, in the order of 10 Angstrom.

In this magnetic tunnel element 1, the first magnetic layer 2 is made from a material whose magnetization direction is changed according to a magnetic field applied from outside. Moreover, this first magnetic layer 2 has a film thickness not limited to a particular value but it should be a value exhibiting a soft magnetic characteristic, for example, in the order of about 200 to several hundreds Angstrom.

On the contrary, the second magnetic layer 4 is not to change its magnetization direction according to an external magnetic field. More specifically, the second magnetic layer 4 is made from, for example, a hard magnetic material whose magnetization is fixed to a single direction or an antiferromagnetic material and the like layered whose magnetization is fixed. Moreover, this second magnetic layer 4 has a film thickness which is, in the case of using an antiferromagnetic film whose magnetization is fixed, in the order of several tens to 200 Angstrom so as to assure fixation of the magnetization.

Moreover, this magnetic head has a magnetic circuit block 5 where the aforementioned magnetic tunnel element 1 is attached. This magnetic circuit block 5 includes a yoke 6 formed in an almost annular shape and a non-magnetic and a non-magnetic block formed so as to be sandwiched by this yoke 6. In this magnetic circuit block 5, the yoke 6, for example, is made from a magnetic material such as NiFe (Permalloy), and the non-magnetic block 7 is made from, for example, a non-magnetic material such as $SiO_2$, $Al_2O_3$, and the like.

In this magnetic circuit block 5, a part of the yoke 6 is magnetically shaded by the non-magnetic block 7. By this, a portion of the magnetic head opposed via the non-magnetic block 7 becomes a magnetic gap.

The magnetic head having the aforementioned magnetic head reproduces a magnetic signal recorded on a magnetic recording medium.

For this, the magnetic head is arranged in such a manner that the magnetic head is opposed to the magnetic gap. A leak magnetic field generated from a magnetic signal recorded on the magnetic recording medium is applied to the vicinity of the magnetic gap. Thus, the magnetic signal is introduced to the yoke 6, so that the yoke 6 is magnetized according to the magnetic signal. More specifically, in this magnetic head, magnetization is induced via the magnetic gap in the direction indicated by the arrow A or B in FIG. 2.

In this magnetic head, the magnetization flowing into the magnetic circuit block 5 is detected by the magnetic tunnel element 1. This magnetic tunnel element 1 generates a magnetic tunneling effect by the magnetization flowing to the yoke 6, and the magnetization flown to the yoke 6 is detected by this magnetic tunneling effect.

Figure 3:
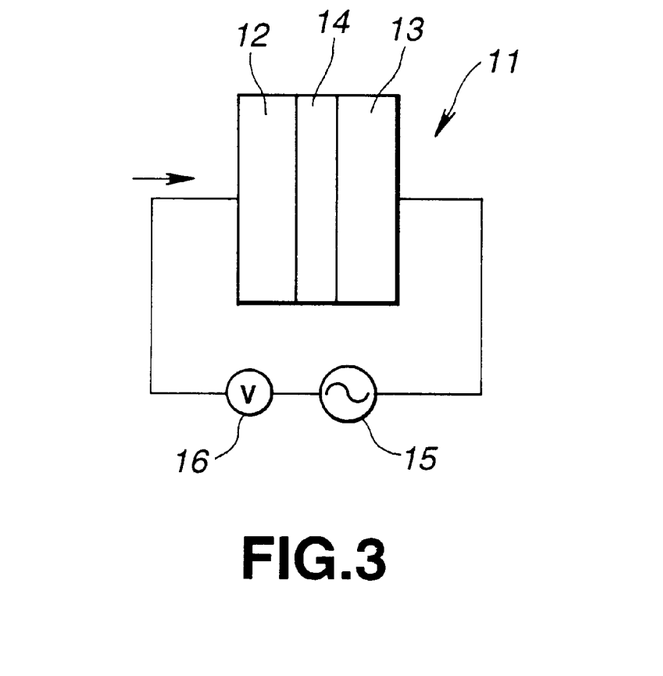
FIG. 3 is a circuit diagram which explains a magnetic field detection by a magnetic tunnel element.
Figure 4A:
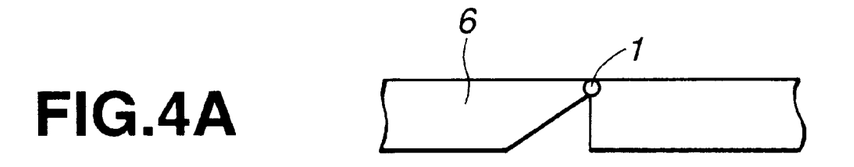
Figure 4B:
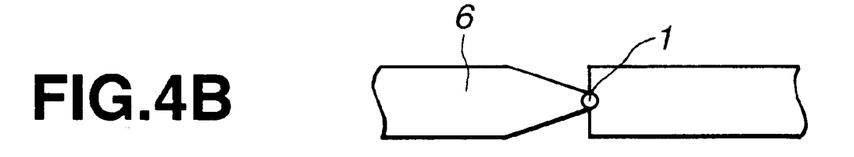
Figure 4C:
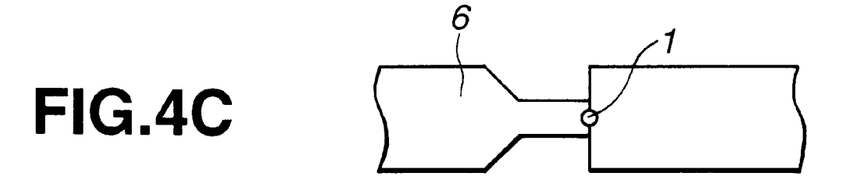
Figure 4D:
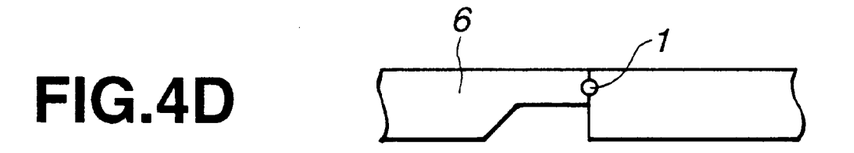
Figure 4E:
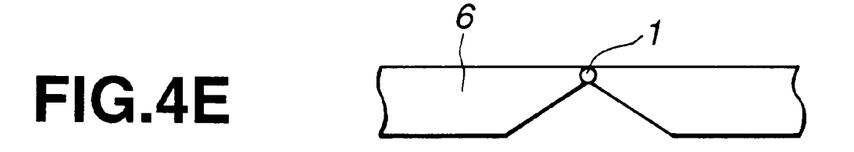
Figure 4F:
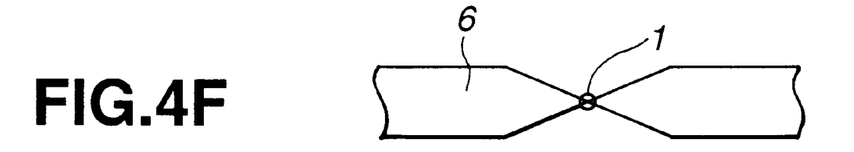
Figure 4G:
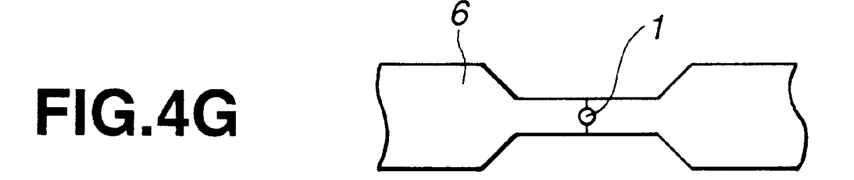
Figure 5:
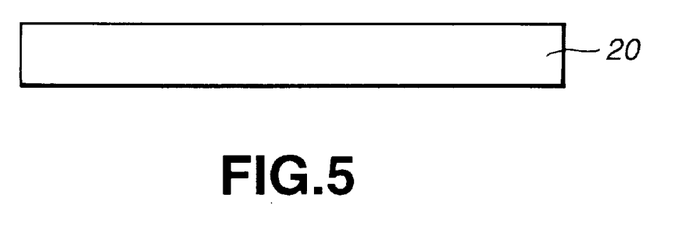
FIG. 5 is a side view showing a substrate for producing a magnetic head.

This magnetic tunneling effect will be explained below with reference to FIG. 3. The magnetic tunnel element 11 shown in FIG. 3 includes a first magnetic layer 12 and a second magnetic layer 13 which are layered via an insulation layer 14. In this magnetic tunnel element 11, the first magnetic layer 12 and the second magnetic layer 13 are connected to a constant current source 15 so as to be supplied with a predetermined current. In this circuit, there is provided a voltmeter 16 for determining a voltage of the flowing current.

In the circuit having the magnetic tunnel element 11 having the aforementioned configuration, the first magnetic layer 12 is assumed to change its magnetization direction according to an external magnetic field, whereas the second magnetic layer 13 is not affected by the external magnetic field and does not change its magnetization direction.

firstly, an external magnetic field almost parallel to the magnetization direction of the second magnetic layer 13 is applied to the circuit having this magnetic tunnel element 11. By this, the first magnetic layer 12 changes its magnetization direction according tot he external magnetic field. That is, the magnetization direction of the first magnetic layer 12 becomes almost parallel to the magnetization direction of the second magnetic layer 13. Next, an external magnetic field anti-parallel to the magnetization direction of the second magnetic layer 13 is applied to the circuit having this magnetic tunnel element 11. By this, the first magnetic layer 12 changes its magnetization direction according to the external magnetic field. However, the second magnetic layer 13 does not change its magnetization direction. That is, in this case, the magnetization direction of the first magnetic layer 12 is anti-parallel to the magnetization direction of the second magnetic layer 13. It should be noted that in each of the cases, a predetermined current is supplied to this circuit.

In the circuit having such a magnetic tunnel element 11, when the magnetization direction of the first magnetic layer 12 is parallel to the magnetization direction of the second magnetic layer 13, a resistance value against the tunnel current flowing via the insulation layer 14 is reduced to a minimum. On the contrary, when the magnetization direction of the first magnetic layer 12 is anti-parallel to the magnetization direction of the second magnetic layer 13, the resistance value against the tunnel current flowing via the insulation layer 14 becomes maximum. Thus, in the magnetic tunnel element 11, the resistance against the tunnel current is changed according to a relative angle of the magnetization direction of the first magnetic layer 12 with respect tot he magnetization direction of the second magnetic layer 13.

Consequently, when a constant current is supplied to the circuit having this magnetic tunnel element 11, the resistance change generated in the magnetic tunnel element 11 is shown as a voltage change of the flowing current. This voltage change is detected by the voltmeter 16, so as to enable to detect a relative angle of the magnetization direction of the first magnetic layer 12 with respect to the magnetization direction of the second magnetic layer 13. That is, according to this magnetic tunneling effect, a predetermined current is supplied to the magnetic tunnel element 11, so that a resistance value against to this current is detected as a voltage value, thus enabling to detect a direction of the external magnetic field.

Now, in the aforementioned magnetic head, the first magnetic layer 2 in the magnetic tunnel element 1 is magnetized according to a magnetic field induced by the yoke 6. That is, this first magnetic layer 2, due to the magnetization induced by the yoke 6, has a predetermined angle with respect to the magnetization direction of the second magnetic layer 4.

In this magnetic head, the constant current source supplies a predetermined current in the layered direction of the magnetic tunnel element 1. By detecting a voltage value of this current, a resistance value of the magnetic tunnel element 1 is detected. According to this resistance value, it is possible to detect a relative angle of the magnetization direction of the first magnetic layer 2 with respect to the magnetization direction of the second magnetic layer 4. In this magnetic head, by detecting the resistance value of the magnetic tunnel element 1 it is possible to sense the direction of the magnetic field induced by the yoke 6.

In the aforementioned magnetic head, the magnetic tunnel element 1 is mounted on the yoke 6 of the magnetic circuit block 5, so that a signal magnetic field from the magnetic recording medium is detected by this magnetic tunnel element 1. This magnetic tunnel element is mounted on the yoke 6 in such a manner that the magnetization direction of the first magnetic layer 2 is changed according to the magnetic field induced by the yoke 6. That is, the magnetic tunnel element 1 is attached so that the magnetization direction of the first magnetic layer 1 is changed. For this, the magnetic head having the magnetic tunnel element 1 need not form a magnetic gap at a part of the yoke 6.

Consequently, in this magnetic head, it is possible to effectively form a magnetic circuit without lowering the efficiency of induction of the magnetic field generated from the magnetic recording medium, to the yoke 6. Accordingly, in the first magnetic layer 2, the magnetization direction is easily changed according to the magnetic field flowing in the yoke 6. Thus, this magnetic head enables to obtain a preferable efficiency of the magnetic field flowing in the yoke 6, which in turn enables to reduce the size of the yoke 6 and the size of the magnetic head, which is appropriate for a high density recording.

Now, in such a magnetic head, it is preferable that the magnetization direction of the first magnetic layer 2 of the magnetic tunnel element 1 be effectively changed. That is, the magnetization direction of the first magnetic layer 2 is preferably changed easily even when the magnetic field generated from the magnetic recording medium is small.

For the purpose of this, in the magnetic head, it is preferable to increase the magnetic flux density flowing to the yoke 6 in the portion where the magnetic tunnel element 1 is mounted. That is, as shown in one of FIGS. 4A–4H it is preferable that the magnetic head be constructed in such a manner that the yoke 6 has a cross-sectional area decreased toward the attachment portion of the magnetic tunnel element 1.

Here, the yoke 6 may have a configuration as shown in FIGS. 4A, 4B, 4C and 4D, where one side has a cross section reduced toward the magnetic tunnel element 1. Alternatively, the yoke 6 may have a configuration as shown in FIGS. 4E, 4F, 4G and 4H where both sides have a cross section reduced toward the magnetic tunnel element 1.

In these cases, the magnetic field flowing in the yoke 6 has a magnetic flux density increased where the cross section is reduced. Consequently, the first magnetic layer 2 can easily be magnetized. Moreover, in these cases, the magnetic field applied to the first magnetic layer 2 is increased, which enables to reduce the size of the yoke 6.

When producing the magnetic head shown in FIG. 2, a substrate 20 as shown in one of FIGS. 4A–4H is firstly prepared. This substrate 20 is made from a non-magnetic material and formed in a desired configuration.

Figure 6:
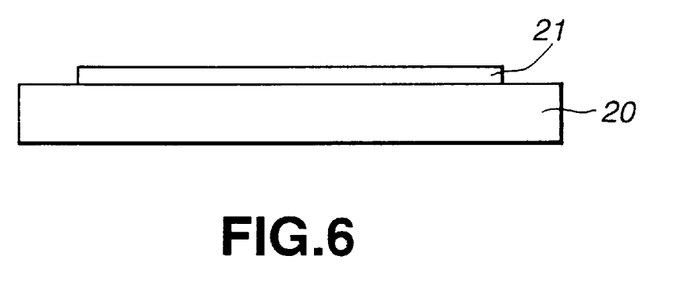
FIG. 6 is a side view of an essential portion with a first yoke formed on the substrate.

Next, as shown in FIG. 6, a yoke 21 is formed on the substrate 20. This first yoke 21 constitutes the magnetic circuit block 5 and is formed over the entire surface of the substrate 20, after which the mask sputter, photolithograpy, or other method is used to obtain a desired configuration.

Figure 7:
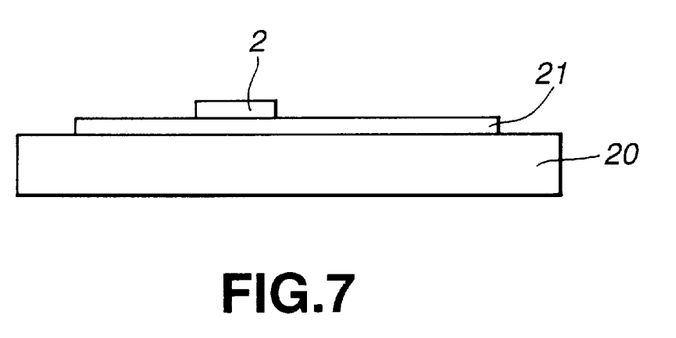
FIG. 7 is a side view showing an essential portion with a first magnetic layer formed on the first yoke.

Next, as shown in FIG. 7, a first magnetic layer 2 is formed on the first yoke 21. This first magnetic layer 2 is made into a desired configuration in the same way as the first yoke 21. Here, the configuration of the first magnetic layer 2 is not limited to a particular one but is preferably rectangular if considering to pull out an electrode. This first magnetic layer 2, as has been described above, is made from a material having an excellent soft magnetic characteristic has a magnetization which is changed depending on the magnetization direction of the first yoke 21.

Figure 8:
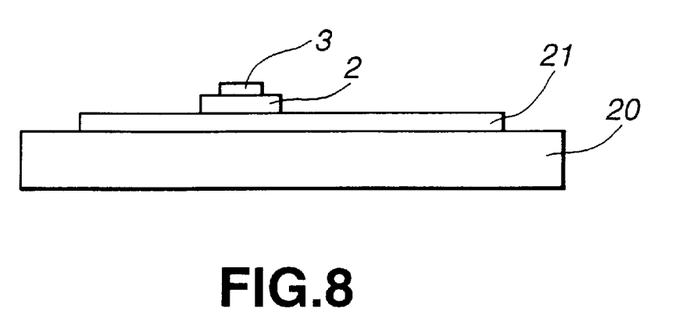
FIG. 8 is a side view showing an essential portion with a insulation layer formed on the first magnetic layer.

Next, as shown in FIG. 8, an insulation layer 3 is formed on the first magnetic layer 2. Here, the insulation layer 3 should have such a film thickness that a tunnel current flows between the first magnetic layer and the second magnetic layer 4 and no electric leak is generated between the first magnetic layer 2 and the second magnetic layer 4. More specifically, the thickness of the insulation layer 3 is in the order of about 10 Angstrom. Moreover, the insulation layer 3 should have an appropriate surface area, considering that the tunnel current can preferably flow.

Figure 9:
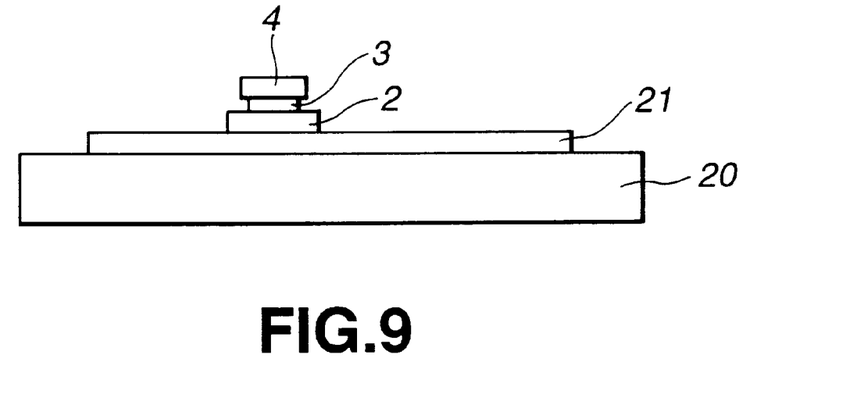
FIG. 9 is a side view showing an essential portion with a second magnetic layer formed on the insulation layer.

Next, as shown in FIG. 9, the second magnetic layer 4 is formed on this insulation layer 3. This second magnetic layer 4 is formed in such a manner that it is not in direct contact with the first magnetic layer 2. This second magnetic layer 4 may have a configuration not limited to a particular like the first magnetic layer, but it is preferable that the configuration be rectangular when considering to pull out an electrode. As has been described above, this second magnetic layer 4 may be made from a hard magnetic material so as to have a magnetization fixed to one direction or a combination of a magnetic layer and an antiferromagnetic layer layered so as to have a fixed magnetization.

Next, an electrode (not depicted) is formed for each of the first magnetic layer 2 and the second magnetic layer 4. These electrodes are connected to a constant current source (not depicted).

Figure 10:
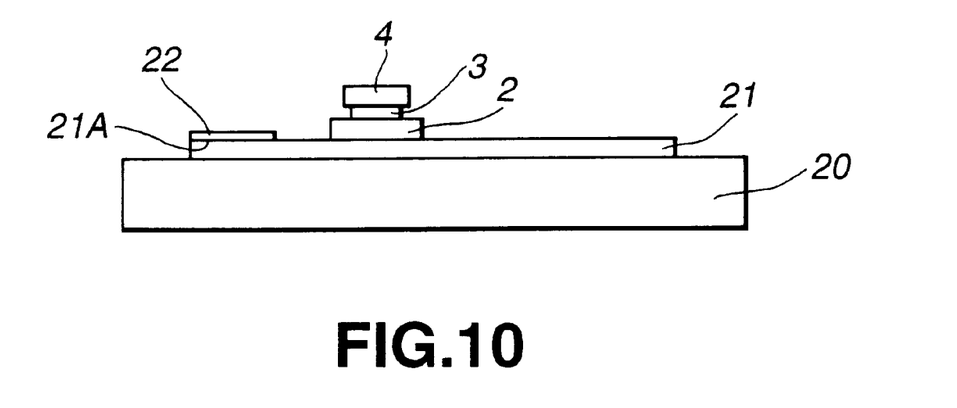
FIG. 10 is a side view showing an essential portion with a non-magnetic block on the first yoke.

Next, as shown in FIG. 10, a non-magnetic film 22 is formed so as to constitute a magnetic gap on one end portion 21A on the first yoke 21. This non-magnetic film 22 has a thickness which is a gap width in the magnetic head and the thickness should be a predetermined value corresponding to the gap width.

Figure 11:
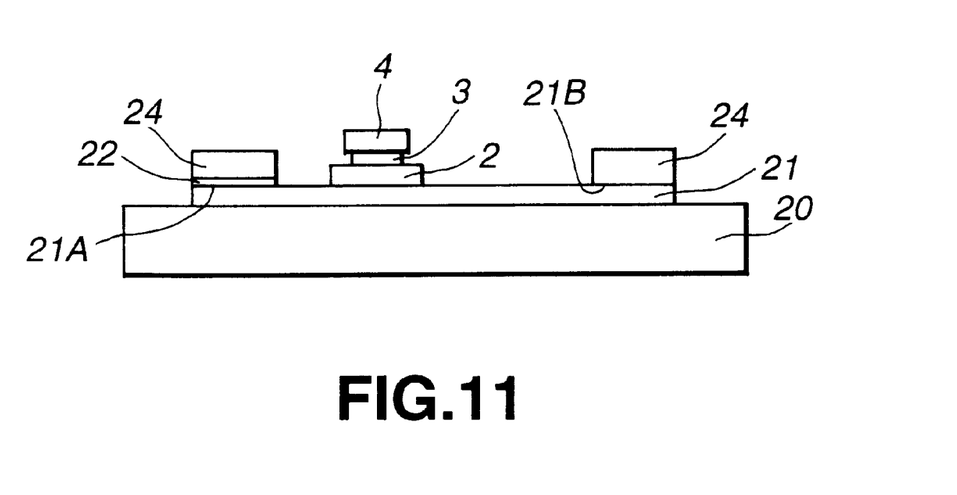
FIG. 11 is a side view showing an essential portion with a second yoke formed.
Figure 12:
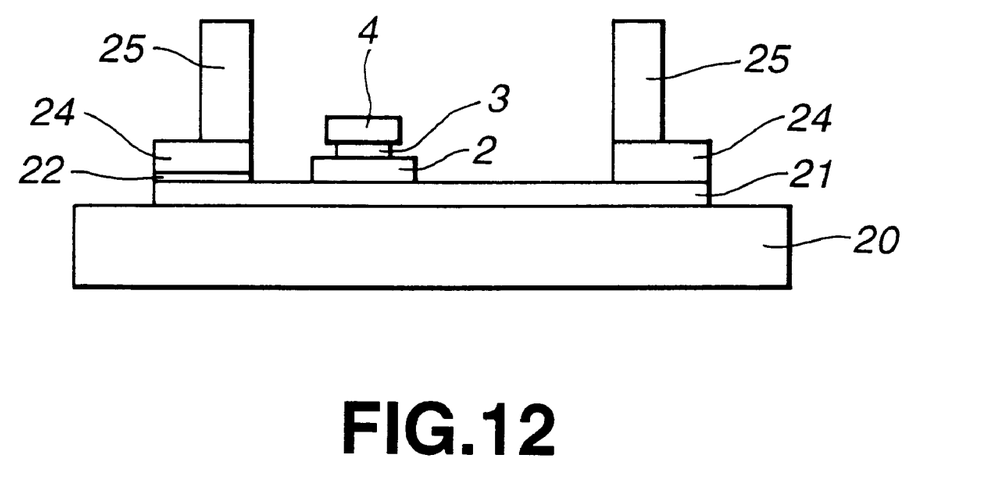
FIG. 12 is a side view showing an essential portion with a second yoke formed.
Figure 13:
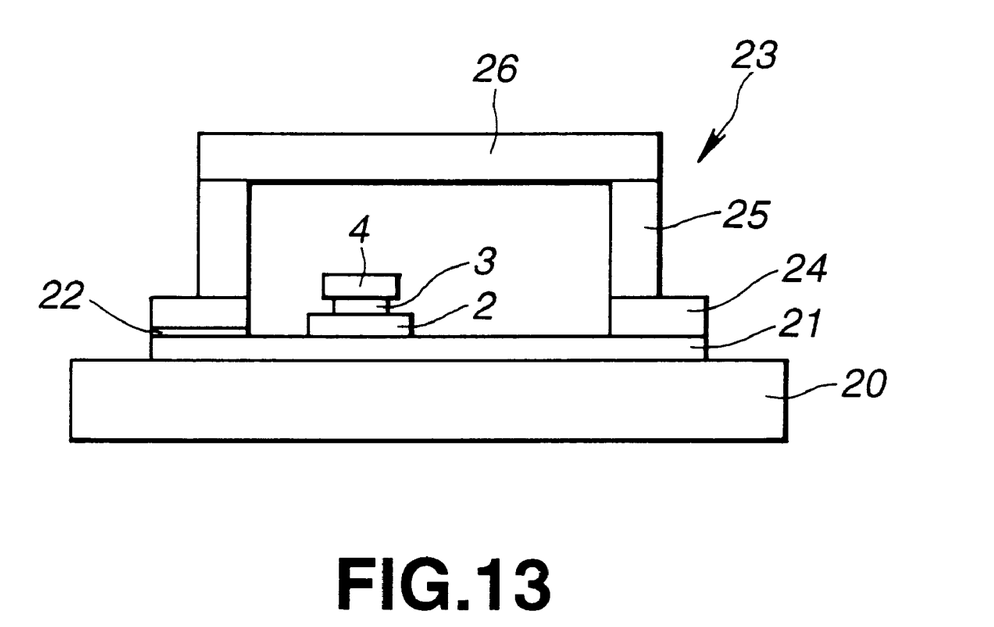
FIG. 13 is a side view showing an essential portion with a second yoke formed.

Next, as shown in FIG. 11 to FIG. 13, the second yoke 23 is formed so as to constitute together with the first yoke 21 the magnetic circuit block 5. When forming the second yoke 23 in this method, firstly, as shown in FIG. 11, a pair of horizontal blocks 24 is formed on the non-magnetic film 22 and on the opposite end portion 21B not having this non-magnetic film 22. Next, as shown in FIG. 12, a pair of vertical blocks 25 are placed so as to extend from the pair of horizontal block 24. Next, as shown in FIG. 13, a bridge block 26 is formed so as to bridge the pair of vertical blocks 25. It should be noted that this second yoke 23 may be formed by using a method such as sputtering and etching if a desired configuration can be obtained.

After this, a mirror finish processing is carried out to the end face where the non-magnetic film 22 is exposed and a grinding or the like is carried out to adjust the entire configuration. Thus, it is possible to obtain a magnetic head as shown in FIG. 2.

Note that the magnetic head according to the present invention is not to be limited to the aforementioned configuration but may be modified if the magnetic field induced in the magnetic circuit block can be detected by the magnetic tunnel element.

Figure 14:
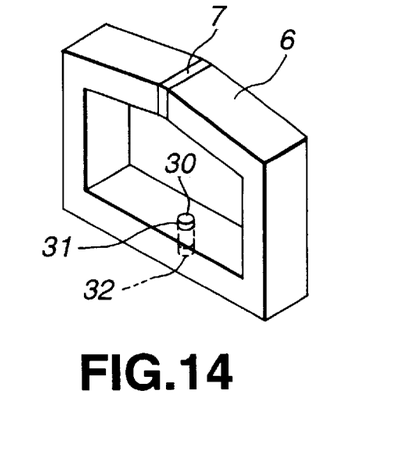
FIG. 14 is a perspective view showing a magnetic head according to another embodiment of the present invention.

That is, the magnetic head may have a configuration as shown in FIG. 14 where a magnetic tunnel element 30 is provided within the yoke 6 serving as the magnetic circuit block 5. This magnetic head has the yoke 6 serving as the magnetic circuit block 5 and the magnetic tunnel element 30 embedded in this yoke 6. This magnetic tunnel element 30 is constructed so that a first magnetic layer 30 is exposed from one surface of the yoke 6 and a second magnetic layer 32 is exposed from the other surface of the yoke 6. In each of the first magnetic layer 32 and the second magnetic layer 32, an electrode is pulled out from the exposure surface and connected to a constant current source (not depicted).

In this magnetic head also, like in the magnetic head shown in FIG. 2, the magnetization direction of the first magnetic layer 31 is changed according to an external magnetic field, whereas the magnetization direction of the second magnetic layer 32 is fixed and not affected by the external magnetic field.

In the magnetic head thus formed, a magnetic field generated from a magnetic recording medium is introduced to the yoke 6 and the magnetic field in the yoke 6 changes the magnetization direction of the first magnetic layer 31. This magnetic head detects as a voltage value a resistance value depending on a relative angle of the magnetization direction of the first magnetic layer 31 with respect to the magnetization direction of the second magnetic layer 32. Thus, the magnetic head can detect the magnetic field of the magnetic recording medium.

Figure 15:
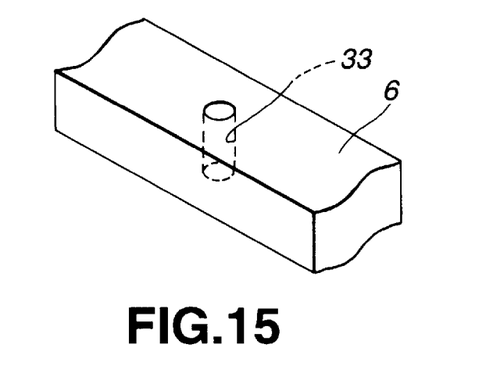
FIG. 15 is perspective and enlarged view showing an essential portion where a magnetic tunnel element is attached in the magnetic head of FIG. 14.

When producing this magnetic head, as shown in FIG. 15, a minute hole is formed at a part of the yoke 6, and the magnetic tunnel element 30 is arranged in this hole 33. Alternatively, in a case when using a thin film formation technique to produce the magnetic head, it is possible to firstly form the magnetic tunnel element 30 and after this, the yoke 6 is formed so that the magnetic tunnel element 30 is embedded.

In the magnetic head having the aforementioned configuration, the yoke 6 can be formed without forming a magnetic gap in the yoke 6. Therefore, it is possible to effectively form a magnetic circuit without lowering the efficiency of induction of a magnetic field generated in a magnetic recording medium, to the yoke 6. Consequently, in the first magnetic layer 31, the magnetization direction is easily changed according to the magnetic field flowing into the yoke 6. Thus, this magnetic head enables to obtain a preferable efficiency of the magnetic field flowing into the yoke 6, which in turn enables to reduce the size of the yoke 6. Accordingly, the magnetic head can be made small, which is appropriate for a high density recording.

Moreover, the magnetic tunnel element 30, as has been described above, is not to be limited to a configuration of embedding in the yoke 6, but it can also be embedded, for example, in a non-magnetic block 7 arranged in a part of the yoke 6. In this case there is no need of providing an area for arranging the magnetic tunnel element 30 in the yoke 6, which enables to reduce the size of the yoke 6. Thus, the magnetic head can be further reduced in size.

Figure 16:
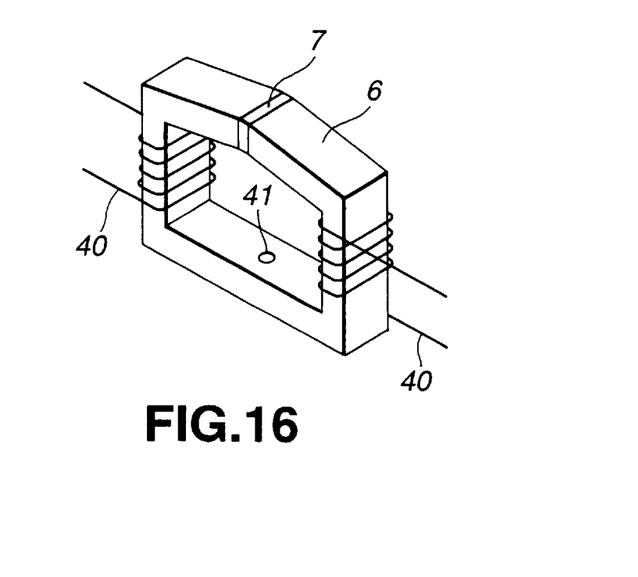
FIG. 16 is a perspective view showing a magnetic head according to still another embodiment of the present invention.

Furthermore, the magnetic head according to the present invention is not to be limited to the aforementioned case where a magnetic tunnel element is used as magnetic field detecting means during reproduction, but can also be applied to a magnetic head for recording a magnetic signal as shown in FIG. 16.

In this case, the magnetic head has a coil 40. This coil 40 is wound around the yoke 6 and supplied with a predetermined current. In this magnetic head, a magnetic tunnel element 41 is arranged at an area no having the coil 40. This magnetic head is constructed in such a manner that the magnetic tunnel element 41 is supplied with a predetermined tunnel current and the coil 40 is supplied with a predetermined current.

In the magnetic head thus constructed, a magnetic signal is recorded onto a magnetic recording medium by supplying a predetermined current to the coil 40. In this magnetic head, the coil 40 supplied with a predetermined current generates a magnetic field, so as to magnetize the yoke 6. In this magnetic head, a magnetic gap is formed by a non-magnetic block 7 in a part of the yoke 6, so that a magnetic field generated from this magnetic gap is applied to the magnetic recording medium.

Here, in the magnetic head, the magnetic tunnel element 41 is supplied with a predetermined current. The magnetic tunnel element 41 is attached to this magnetic head and detects a magnetization state of the yoke 6. Consequently, in this magnetic head, it is possible to observe whether a magnetic field appropriate for recording is generated. In this magnetic head, according to the magnetization state of the yoke 6, it is possible to adjust the current supplied to the coil 41. Therefore, this magnetic head enables to always preferably record a signal magnetic field.

As has been detailed above, the magnetic head according to the present invention employs a magnetic tunnel element as magnetic field detecting means and enables to form a magnetic circuit block not having a magnetic gap. Consequently, the magnetic circuit block can effectively induce a magnetic field generated from a magnetic recording medium. Therefore, this magnetic head enables to effectively apply a magnetic field to the magnetic tunnel element and to obtain a preferable recording/reproduction characteristic.

Moreover, in this magnetic head, it is possible to realize a preferable efficiency of the magnetic field induced in the magnetic circuit block as well as to reduce the size of the magnetic circuit block because the magnetic tunnel element is used as the magnetic field detecting means. Thus, it is possible to significantly reduce the size of the entire magnetic head.

What is claimed is:

1. A magnetic tunnel element head comprising:

a magnetic circuit block having a magnetic yoke and a non-magnetic body formed so as to be sandwiched by said yoke, through which non-magnetic body a first portion and a second portion of said yoke are opposed to each other so as to form a magnetic path through a single magnetic gap;

a magnetic tunnel element attached to an inner surface of said yoke of said magnetic circuit block, said magnetic tunnel element comprising a first magnetic layer, a second magnetic layer and an insulation layer, the first and second magnetic layers and the insulation layer being arranged in a layered stack such that the insulation layer is disposed between the first and second magnetic layers, the insulation layer being such that a tunnel current can flow therethrough between the first and second magnetic layers, the first and second magnetic layers being magnetized in predetermined directions so as to have a predetermined relative angle of magnetization between them, the first magnetic layer magnetization direction being fixed, the second magnetic layer being arranged so as to be in contact with and parallel to the magnetic circuit block, the magnetic tunnel element being such that a magnetic field induced into the magnetic circuit block by a magnetic recording medium moved relative to the magnetic tunnel element head changes the relative angle of magnetization between the first and second magnetic layers and thus a resistance value associated with the tunnel current.

2. A magnetic head as claimed in claim 1, wherein said magnetic tunnel element is arranged in such a manner that magnetization of said first layer is fixed and said second magnetic layer is arranged so as to be in contact with said magnetic circuit block.

3. A magnetic head as claimed in claim 1, wherein said magnetic tunnel element is arranged in such a manner said first magnetic layer has a fixed magnetization and is embedded in said magnetic circuit block.

4. a magnetic head as claimed in claim 3, wherein said magnetic tunnel element is arranged in a non-magnetic body of said magnetic circuit block.

5. A magnetic head as claimed in claim 1, wherein said magnetic tunnel element has such a configuration that a lead wire extends from each of said first magnetic layer and said second magnetic layer and the lead wires are insulated from each other.

6. A magnetic head as claimed in clam 1, wherein said magnetic circuit block has such a configuration that its cross sectional area is reduced toward a mounting portion where said magnetic tunnel element is attached.

* * * * *